United States Patent [19]

Terrell

[11] 3,862,242

[45] Jan. 21, 1975

[54] METHOD FOR PURIFICATION

[75] Inventor: Ross C. Terrell, Plainfield, N.J.

[73] Assignee: Airco, Inc., New York, N.Y.

[22] Filed: Nov. 1, 1972

[21] Appl. No.: 302,987

[52] U.S. Cl. .............................................. 260/616
[51] Int. Cl. ........................................... C07c 41/12
[58] Field of Search ............. 260/614 F, 616, 615 A

[56] References Cited
UNITED STATES PATENTS
3,527,813  9/1970  Terrell............................ 260/614 F OTHER PUBLICATIONS
Kaufmann et al., Organic Synthesis, Vol. V, (1925), p. 54–58.
Post et al., J.A.C.S., Vol. 55, (1933), p. 3851–3854.

Primary Examiner—Howard T. Mars
Attorney, Agent, or Firm—Roger M. Rathbun; Edmund W. Bopp; H. Hume Mathews

[57] ABSTRACT

This invention relates to a process for purifying 1,1,2-trifluoro-2-chloroethyl difluoromethyl ether ($CHF_2OCF_2CHFCl$), and specifically to the separation of chloroform ($CHCl_3$) from an azeotropic mixture of $CHF_2OCF_2CHFCl$ and $CHCl_3$ which is formed during the production of the ether. According to the invention, the azeotropic mixture is reacted with an alkali metal basic solution in the presence of a water soluble alcohol and refluxed sufficiently to destroy all of the $CHCl_3$. The $CHF_2OCF_2HFCl$ can then be purified simply and economically by conventional fractional distillation techniques.

7 Claims, No Drawings

METHOD FOR PURIFICATION

This invention relates to the purification of 1,2,2-trifluoro-2-chloroethyl difluoromethyl ether ($CHF_2OCF_2CHFCl$). While, for commercial development applications, it is desirable to obtain $CHF_2OCF_2CHFCl$ which is at least 99.9% pure, it has been found that in the production of $CHF_2OCF_2CHFCl$ by the fluorination of the corresponding dichloromethyl ether using fluorinating agents in the presence of pentavalent antimony salts and tetravalent halides as fluorination catalysts, as disclosed in U.S. Pat. No. 3,527,813, chloroform ($CHCL_3$) is unavoidably formed as an impurity. Since this chloroform and $CHF_2OCF_2CHFCl$ form an azeotropic mixture having a boiling point of 53°C., which is close to that of pure $CHF_2OCF_2CHFCl$ (b.p. 57°C.), it has been found to be impractical and uneconomical to remove the $CHCl_3$ completely by distillation. Although the $CHCl_3$ can be removed from the bulk of the product by distillation, the lower boiling fractions containing $CHCl_3$ also contain a substantial amount of $CHF_2OCF_2CHFCl$.

The present invention relates to a simple and economical process for the purification of $CHF_2OCF_2CHFCl$, and specifically to the separation of $CHCl_3$ from the azeotropic mixture of $CHF_2OCF_2CHFCl$ and $CHCl_3$ which is formed during the production of the ether.

In accordance with this invention, it has been found that $CHCl_3$ can be removed from the azeotropic mixture of $CHF_2OCF_2CHCl$ and $CHCl_3$ by reacting the mixture with an alkali metal basic solution, preferably a hydroxide solution, in the presence of a water soluble alcohol, refluxing sufficiently to destroy all of the $CHCL_3$ and fractionally distilling to recover pure $CHF_2OCF_2CHFCl$. The $CHF_2OCF_2CHFCl$-containing azeotropic mixture, which may contain from about 0.5 to 30% by weight of $CHCl_3$, is reacted at about 30° to 100°C., preferably about 50° to 60°C., at atmospheric pressure with an alkali metal basic compound, preferably in the form of an aqueous solution such as an alkali metal hydroxide solution, e.g. NaOH, KOH, LiOH or Ca (OH)$_2$ although other solutions, e.g. $NaOCH_2CH_3$ can be used. Commercial grades of NaOH, for example, 50% C.P. U.S.P. solutions, are also suitable. The amount of basic solution used is determined from the amount of $CHCl_3$ present in the mixture. At least 4 moles of the basic compound, e.g. NaOH, per mole of $CHCl_3$ are used. An excess of basic solution, e.g. 4 to 10 moles basic compound per mole of $CHCl_3$ can be used, if desired, and this results in a faster reaction. A water soluble alcohol is also added to the reaction mixture to improve the reaction. While methanol is preferred, any water soluble alcohol, e.g. lower alkanols having 1 to 6 carbon atoms including ethanol, etc. and polyhydroxy compounds including glycols such as ethylene glycol, is suitable. The alcohol is added in an amount of about 0.1 to 2 parts by volume, or more, per volume of basic solution used, but is preferably in the range of 0.5 to 1 parts volume of alcohol per part of basic solution. This mixture is then refluxed until all of the $CHCl_3$ has been destroyed by reaction. Following refluxing, chloroform-free $CHF_2OCF_2CHFCl$ can be obtained by fractional distillation of the reaction mixture.

The following examples are given to further illustrate the invention, but it is to be understood that the invention is not to be limited in any way by the details described therein.

EXAMPLE I

Azeotropic mixtures of $CHF_2OCF_2CHFCl$ and $CHCl_3$ produced during the preparation of $CHF_2OCF_2CHFCl$ and containing from 0.5 to 35% chloroform are reacted with enough of 50% NaOH solution so that the molar ratio of $NaOH/CHCl_3$ is equal to about 8 (twice the calculated quantity). The reaction in each instance is enhanced by adding a volume of methanol equal to the volume of NaOH solution. The reaction is carried out in a reactor with a reflux condenser at 50° to 70°C. and a pressure of 760 mm. The reaction is completed by refluxing in the same reactor until all of the $CHCl_3$ is destroyed and the $CHF_2OCF_2CHFCl$ is separated by fractional distillation. Recovery of $CHF_2OCF_2CHFCl$ (99.9% pure) is 80% of the theoretical amount.

EXAMPLES II THROUGH IV

The $CHF_2OCH_2CHFCl$ is purified following the same procedure described in Example I except that the alkali metal basic solution used in the reaction is KOH, LiOH and Ca(OH)$_2$, respectively.

EXAMPLES V THROUGH VII

The $CHF_2OCF_2CHFCl$ is purified following the same procedure described in Example I except that the water soluble alcohol used in the reaction is ethanol, propanol and ethylene glycol, respectively.

It is claimed:

1. A process for recovering pure 1,1,2-trifluoro-2-chloroethyl difluromethyl ether from a reaction product containing an azeotropic mixture of $CHF_2OCF_2CHFCl$ and $CHCl_3$ comprising reacting the product containing the azeotropic mixture with an aqueous solution of a basic compound selected from the group consisting of alkali metal hydroxides and Ca(OH)$_2$ in the presence of a water soluble alcohol selected from the group consisting of lower alkanols of 1 to 6 carbon atoms and ethylene glycol, said basic compound being used in an amount of at least four moles basic compound per mole of $CHCl_3$, said alcohol being used in an amount in excess of about 0.1 parts by volume per volume of aqueous solution, refluxing the reaction mixture sufficiently to destroy the $CHCl_3$ and recovering essentially pure $CHF_2OCF_2CHFCl$ from the reaction mixture by fractional distillation.

2. The process of claim 1 in which the basic compound is an alkali metal hydroxide.

3. The process of claim 2 in which the water soluble alcohol is ethylene glycol.

4. The process of claim 1 in which the alcohol is present in an amount of 0.1 to 2 parts volume per part volume of basic compound.

5. The process of claim 4 in which from about 4 to 10 moles basic compound per mole of chloroform are used.

6. The process of claim 5 in which the basic compound is an alkali metal hydroxide and the alcohol is a lower alkanol.

7. The process of claim 6 in which the alkali metal hydroxide is sodium hydroxide and the lower alkanol is methanol.

* * * * *

UNITED STATES PATENT OFFICE
CERTIFICATE OF CORRECTION

PATENT NO. : 3,862,242
DATED : January 21, 1975
INVENTOR(S) : ROSS C. TERRELL

It is certified that error appears in the above-identified patent and that said Letters Patent are hereby corrected as shown below:

Col. 1, line 2, "1,2,2" should read -- 1,1,2 --;

line 30, "$CHF_2OCF_2CHCl$" should read -- $CHF_2OCF_2CHFCl$ --.

Signed and sealed this 6th day of May 1975.

(SEAL)
Attest:

RUTH C. MASON
Attesting Officer

C. MARSHALL DANN
Commissioner of Patents
and Trademarks